106. COMPOSITIONS, COATING OR PLASTIC.

Patented July 23, 1940

2,208,571

UNITED STATES PATENT OFFICE 2,208,571

PROCESS OF PREPARING ACIDPROOF WATER-RESISTANT MORTARS

Karl Dietz, Cronberg, Taunus, and Karl Frank, Bad Soden, Taunus, Germany, assignors, by mesne assignments, to Pen-Chlor, Incorporated, Philadelphia, Pa., a corporation of Delaware No Drawing. Application April 15, 1937, Serial No. 137,026. In Germany April 25, 1936

4 Claims. (Cl. 106—30)

The present invention relates to a process of preparing acidproof, water-resistant mortars.

In the preparation of self-hardening acidproof water-glass cements the commercial sodium silicate solution of the specific gravity 1.33 to 1.36 (36° Bé. to 38° Bé.) and a molecular proportion of $Na_2O$ to $SiO_2$ as 1 to 3.3 is generally used for mixing with cement powders containing materials capable of strongly reacting with the alkali of the water-glass, for instance, fluosilicates, and preferably also with acid resistant filling agents such as quartz powder, or the like. It is a known fact that the cement-work composed of water-glass cement has the drawback of being relatively permeable to liquids so that in all constructions exposed to the action of acid, insulating layers must be applied.

We have found that a considerable increase of the impermeability to liquids in case of water-glass cements may be attained by taking care that for mixing known self-hardening pulverized mortars there are used liquid solutions of sodium silicate in which the proportion of silicic acid to water is greater than 1:2.5. By numerous tests it has been proved that the best results are obtained with water-glass solutions in which the proportion of silicic acid to water is still greater than 1:2.0, preferably between 1:1.5 and 1:2.0.

These are practically water-glass solutions with an especially low content of water and of a specific gravity of about 1.5 to 1.6 in which the solubility in water of the sodium silicate has been improved by an increase of the content of sodium oxide so that the molecular proportion of $SiO_2$ to $Na_2O$ generally is below 3.0:1 downward to 2.0:1. It could by no means be foreseen that, in spite of this increase of the content of alkali and the increase of readily soluble compounds in the ready made cement mass caused thereby, this cement mass is considerably more impervious than the hitherto usual cements.

Though by the use of these water-glass solutions a somewhat increased quantity of alkali compounds may enter into the water-glass cement-work, it has, nevertheless, been found that the water from the water-glass solution contained in the silicic gel is so tightly set if the proportions of silicic acid and water above referred to are applied that the cements worked up with this kind of water-glass, contrary to what has been expected, are substantially impermeable to liquids and completely water-resistant.

For the preparation of self-hardening acidproof and water-resistant mortars which contain in the pulverized mortar substances capable of reacting with alkali there are furthermore preferably used those hardening substances which form sparingly soluble compounds when being caused to react with the alkali of the water-glass solution.

The following examples serve to illustrate the invention, but they are not intended to limit it thereto:

(1) 93.4 grams of powdered quartz of an exactly defined granular size are mixed with 6.6 grams of sodium silico-fluoride and about 28 cc. of a liquid solution of sodium silicate of the specific gravity 1.5 in which the proportion of silicic acid to water is 1:1.7. The hardening of the cement mass occurs after the course of some 15 hours. The cement work has a resistance to compression of 400 kilograms to 500 kilograms per square centimeter and it is resistant to acids and water. Samples of cement which have been prepared with application of commercial water-glass are generally permeable to liquids; whereas samples of the above described product are not only considerably more solid from a mechanical point of view, but they are also impermeable to liquids.

(2) 93.4 grams of powdered quartz are mixed with 4.6 grams of sodium silico-fluoride 2.0 grams of calcium silicium fluoride and 30 cc. of a liquid solution of sodium silicate of the specific gravity 1.5 in which the proportion of silicic acid to water is 1:1.7. The hardening of the cement mass occurs after the course of 1 hour. The resistance to compression of the cement work amounts to 400 kilograms to 500 kilograms per square centimeter. The difference between this product and the products prepared by means of commercial water-glass is the same as described in Example 1. Instead of calcium silico-fluoride barium silico-fluoride may also be used.

(3) 90 grams of powdered quartz of an exactly defined granular size are mixed with 7 grams of sodium silico-fluoride, 3.0 grams of barium silico-fluoride and 30 cc. of a liquid solution of sodium silicate of the specific gravity 1.56 in which the proportion of silicic acid to water is 1:1.85. The hardened samples of cement have a resistance to compression of about 500 kilograms per square centimeter and are substantially impermeable to liquids.

We claim:
1. In the process of preparing acid-proof, water-resistant mortars containing water-glass impermeable to liquids, the step which comprises mixing with dry mortar powders containing acid-resistant filling agents and additions which render the whole mixture self-hardening liquid solutions of sodium silicate of a specific gravity of about 1.5 to 1.6 in which the proportion of silicic acid to water is greater than 1:2.5 and the molecular proportion of silicic acid to sodium oxide is smaller than 3.0:1.

2. In the process of preparing acid-proof, water-resistant mortars containing water-glass impermeable to liquids, the step which comprises mixing with dry mortar powders containing acid-resistant filling agents and silico fluorides liquid solutions of sodium silicate of a specific gravity of about 1.5 to 1.6 in which the proportion of silicic acid to water is greater than 1:2.5 and the molecular proportion of silicic acid to sodium oxide is smaller than 3.0:1.

3. Process of preparing acid-proof, water-resistant mortars impermeable to liquids which comprises mixing a dry mortar powder containing 4.6 grams of sodium silico-fluoride and 2 grams of calcium silico-fluoride with 30 cc. of a liquid solution of sodium silicate of a specific gravity of about 1.5 in which the proportion of silicic acid to water is 1:1.7.

4. Process of preparing acid-proof, water-resistant mortars impermeable to liquids which comprises mixing a dry mortar powder containing 90 grams of powdered quartz, 7 grams of sodium silico-fluoride and 3 grams of barium silico-fluoride with 30 cc. of a liquid solution of sodium silicate of a specific gravity of 1.56 in which the proportion of silicic acid to water is 1:1.85.

KARL DIETZ.
KARL FRANK.